United States Patent
Lawrence

[11] Patent Number: 5,855,420
[45] Date of Patent: Jan. 5, 1999

[54] ELECTRONICALLY CONTROLLED BRAKE BOOSTER AND METHOD OF OPERATION THEREOF

[75] Inventor: Alan Lawrence, Birmingham, Great Britain

[73] Assignee: Lucas Industries public limited company, Solihull, Great Britain

[21] Appl. No.: 826,631

[22] Filed: Apr. 3, 1997

[30] Foreign Application Priority Data

Apr. 3, 1996 [EP] European Pat. Off. .............. 96302369

[51] Int. Cl.$^6$ ................................ B60T 8/44; B60T 13/68
[52] U.S. Cl. ........................ 303/113.4; 188/356; 303/125; 303/114.3; 303/155
[58] Field of Search ............................. 303/114.3, 113.4, 303/125, 155, 135, 3, 166, 20, 122.08, 113.3, 191, 193, 176, 10, DIG. 3, DIG. 4; 91/376 R, 369.1; 188/356, 357, 156, 158; 251/129.08; 180/167–169; 701/71, 70

[56] References Cited

U.S. PATENT DOCUMENTS

| | | | |
|---|---|---|---|
| 5,658,055 | 8/1997 | Dieringer et al. | 303/113.4 |
| 5,711,204 | 1/1998 | Michals | 91/376 R |

FOREIGN PATENT DOCUMENTS

| | | |
|---|---|---|
| 43 24 205 | 1/1995 | Germany . |
| 44 27 380 | 10/1995 | Germany . |
| 44 25 578 | 1/1996 | Germany . |

*Primary Examiner*—Douglas C. Butler
*Attorney, Agent, or Firm*—MacMillan, Sobanski & Todd, LLC

[57] ABSTRACT

An electronically controlled brake booster for a vehicle brake system including a housing having a vacuum chamber and a servo chamber separated from the vacuum chamber by a movable wall. The brake booster further includes a control valve operable by an electromagnet. The control valve is coupled to the wall for common relative movement with respect to the housing. The electromagnet is connectable to a control unit generating a drive signal to operate the electromagnet. A braking pressure generation unit is connected to the movable wall for generating a braking pressure for a brake of the vehicle in dependance on the position of the movable wall. The drive signal is generated in the control unit in dependance on a control parameter, the parameter being adjusted in dependance on a dead time of the braking pressure between supplying the electromagnet with the signal and a rising of the braking pressure in response thereto.

20 Claims, 4 Drawing Sheets

ELECTRONICALLY CONTROLLED BRAKE BOOSTER AND METHOD OF OPERATION THEREOF

DESCRIPTION

The present invention relates to an electronically controlled brake booster for a brake system of a motor vehicle brake system, comprising a housing having a vacuum chamber and a servo chamber separated from said vacuum chamber by a movable wall, a control valve unit operable by an electromagnet arrangement, said control valve unit being coupled to said movable wall for common relative movement with respect to said housing of said brake booster, said electromagnet arrangement being connectable to an electronic control unit generating a drive signal to operate said electromagnet arrangement, a braking pressure generation unit being operatively connected to said movable wall for generating a braking pressure for at least one brake of said motor vehicle in dependance from the position of said movable wall.

A similar system is known from DE 40 28 290 C1 wherein the operating speed of the brake pedal caused by the driver in its respective position is the only criterion taken for triggering an automatic braking. In the system described therein a comparison is made between the speed of operation of the brake pedal in its respective position caused by the driver and an invariable threshold value and depending on the result of such comparison an emergency braking is induced or not.

DE 41 02 496 A1 discloses a brake pressure control device which measures the force applied to the brake pedal or, as a value directly correlated therewith, the brake pressure produced in a hydraulic brake circuit in order to lock that brake circuit in which an increased brake pressure is measured when a threshold value is exceeded.

Moreover, triggering the emergency braking means that the main brake hoses have to be locked with respect to the main brake cylinder and the output pressure of an auxiliary pressure source has to be applied in a valve controlled manner to the wheel brakes. This results in that there is no longer a connection between the hydraulic side of the brake pedal and the wheel brakes so that the brake pedal has become "hard" and path-dependent control of the automatic brake operation is no longer possible, provided no additional buffer volumes which can be displaced by the driver's pedal operation with the main brake cylinder being locked with respect to the wheel brakes are provided. This would be the only possibility of a simulation of the pedal travel from the variation in time of which a driver's request regarding the expected vehicle deceleration could be recognized and taken into account during the further braking.

Further, such method of operation has the disadvantage that delay times inherent in the system, the rigidity of the hydraulic system, the brake booster and the mechanical backlash of the brake pedal mechanics, particularly at the beginning of the pedal operation path, lead to operating speeds of the brake pedal which trigger an automatic brake operation not requested by the driver since the respective threshold is reached or exceeded for a short time, respectively.

This means that with a brake system having a lower rigidity the predetermined threshold is reached too early, while with a brake system having a rigidity which is too high the predetermined threshold is reached too late. Since the rigidity of the brake system even can change while the vehicle is in motion and over the service life of the vehicle, a reliable operation of the brake system is not always ensured.

From DE 44 25 578 A1 a method for operating a block protected braking system for motor vehicles to provide driving stability and/or anti-slip control is known which comprises a brake booster which can be activated pneumatically, regardless of the driver's intention. This provides for activation of the brake booster upon initiation of the regulation, regardless of the driver's intention, in order to achieve the quickfill of the wheel brake of the vehicle and a further pressure buildup in the wheel brakes of the vehicle by means of the ABS return pump upon completion of the quickfill operation.

It is, however, disadvantageous that the vacuum prevailing in the vacuum chamber is not included quantitatively in the regulating process. Particularly in a motor vehicle equipped with an Otto engine where the vacuum which is inherently produced in the intake pipe is available for the vacuum chamber, large variations of the vacuum can occur which have a detrimental influence on the system performance. An inadequate vacuum, for example, will result in a sluggish response behaviour.

It is further proposed in the DE 44 25 578 A1 that upon initiation of the regulation a volume of a pressure agent stored in a pressure accumulator is employed for the quickfill of the wheel brakes.

On the one hand, this configuration results in an regulation process which is independent of the vacuum in the vacuum chamber. On the other hand, however, considerable drawbacks result with respect to efforts and cost because of the additionally required components such as pressure accumulator, shut-off valve and pressure sensing means.

The problem underlying the invention is to improve an electronically controlled brake booster for a road vehicle brake system of the kind mentioned above so that the influence of the delay times inherent in the system are reduced.

In order to solve this problem, said drive signal is generated in said electronic control unit ECU in dependance from at least one control parameter, and said at least one control parameter being adjusted in dependance from the dead time of said braking pressure between supplying said electromagnet arrangement with said drive signal and a rising of said braking pressure in response thereto.

The invention is based on the following surprising findings: A dead time of the system can be used as a factor to adapt this behaviour of the brake booster. The performance of the controller of the brake system is improved in dependance from the pressure in the vaccum chamber. This pressure can be detected by measuring a time interval, i.e. the dead time.

The invention applies to an electronically controllable braking system for motor vehicles. This system has a braking pressure generation unit which can be activated via a brake pedal for adjusting a braking pressure in at least one wheel brake. An electronically controllable brake booster is provided for assisting the activation of the braking pressure generation unit or for the automatic activation of the braking pressure generation unit independently of an actuation of the brake pedal.

The invention allows to improve the performance of an electronically controllable braking system of the type mentioned above, while at the same time avoiding the above mentioned drawbacks.

Indirectly, the adjustment of the braking pressure in one or more wheel brakes is made depending on the pressure prevailing in the vacuum chamber of the electronically controllable brake booster.

According to the invention, the electronically controlled brake booster comprises a sensor sensing operating conditions of the motor vehicle brake system for said electronic control unit ECU and producing signals which are characteristic for said operating conditions. These signals are evaluated by said control unit for producing said drive signal.

The sensor is formed as a pressure sensor sensing at least said braking pressure.

In one embodiment of the invention the electronic control unit can be provided with a controller means having an input port for a reference variable and an output port for the drive signal. The control parameters are characteristics of the controller means having PID action. The amplification factor is K, the integration time constant is $T_I$ and the differentiation time constant is $T_D$. Thus, the drive signal can be expressed as $$I_{26}(t) = K * \left[ x_d(t) + 1/T_I * \int_0^t x_d(t)dt + T_D * dx_d(t)/dt \right].$$

Alternatively, the electronic control unit can be provided with a process computer (microprocessor) having an input port for a reference variable, and an output port for said drive signal. The control parameters are the characteristics of a recursive control algorithm executed in the process computer based on the following equation:

$$I_{26}(k) = p_1 * I_{26}(k-1) + q_0 * xd(k) + q_1 * x_d(k-1) + q_2 * x_d(k-2)$$

where the sampling time is $T_0$; $p_1=1$; $q_0=K(1+T_D/T_0)$, $q_1=-K(1+2 T_D/T_0-T_0/T_1)$; and $q_2=K T_D/T_0$.

The control parameters ($p_1$, $q_0$, $q_1$, $q_2$) are adjusted in dependance from the dead time ($T_t$) when the sensor means (31) signals the rising of said braking pressure.

In one embodiment of the recursive algorithm alternative the control parameters are being repeatedly adjusted during the lapse of the dead time in dependence from the current duration of the dead time. This involves a continuous update of the context parameters while the dead time is increasing. Consequently, at the end of the dead time, the parameters are immediately available with optimum settings. Hence, the controller can act more instantly.

Therefore, the PID action of the controller means is superimposed by an adaptation means adjusting said control parameters in order to adapt the behaviour of the PID action of the controller means to varying properties of the braking pressure unit.

According to the invention the electronic control device is adapted to execute the following steps:
  monitoring the reference variable ($P_{nominal}$) in order to detect a change thereof,
  continuously
  determining whether the dead time $T_t$ has ended,
    setting the parameters $p_1$, $q_0$, $q_1$, $q_2$ as a function of the current value of the dead time $T_t$ in accordance with predetermined relations; and
    determining whether the braking pressure ($p_{29}$;) has changed.

The electronic control device is adapted to determine whether a maximum value of the dead time $T_t$ is exceeded by starting a timer upon the detecting of a change of the reference variable ($p_{nominal}$). This allows for safety checks during the operation and for a simple system design.

The electronic control device (ECU) can be adapted to set the control parameters K, $T_I$, $T_D$, $p_1$, $q_0$, $q_1$, $q_2$ as in accordance with predetermined time intervals of the dead time $T_t$. Thus, a more compact programming and less execution time is required during the operation.

The adjustment of the braking pressure is particularly advantageous in a closed control loop. This allows for the compensation of detrimental pressure fluctuations in the vacuum chamber of the electronically controllable brake booster by optimizing the control behaviour through the use of an adaptive controller.

Further advantages can be achieved if an adaptive controller is employed, the adaptation algorithm of which does not require the measurement of a system parameter, so that cost advantages result by saving measuring means such as a pressure sensor for sensing the pressure in the vacuum chamber.

Further features, advantages and characteristics of the invention are explained in the following with reference to the drawings, in which.

Figure 1:
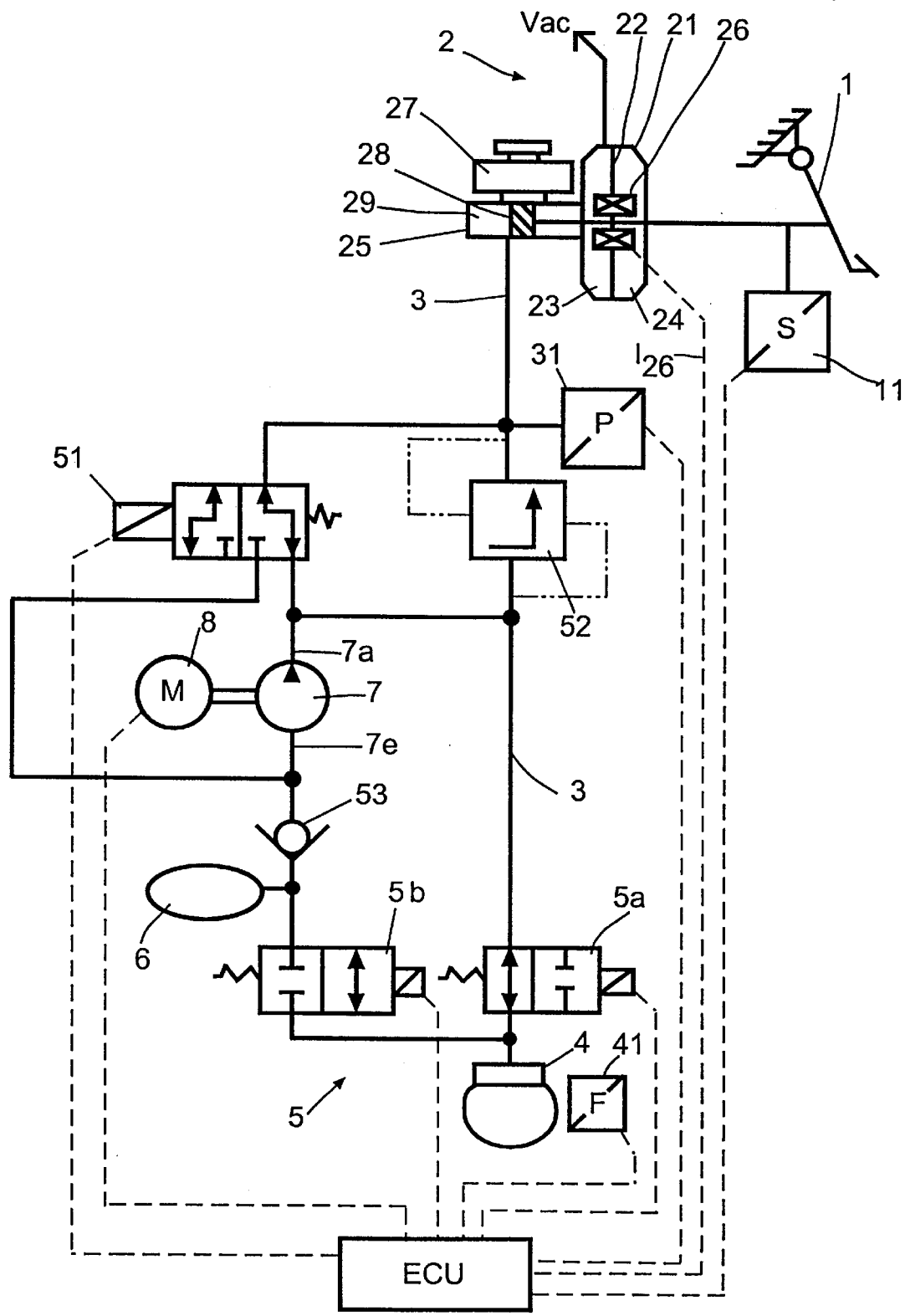
FIG. 1 shows a schematic illustration of an electronically controllable braking system for motor vehicles.

FIG. 1 shows an electronically controllable braking system for motor vehicles. A brake pedal 1 serves to activate a braking pressure generation unit 2 via an actuation element. The braking pressure generation unit 2 comprises a brake cylinder 25, a piston 28 of which forms a servo chamber 29. The servo chamber 29 is supplied with brake fluid from a reservoir 27. A brake line 3 connects the servo chamber 29 with a wheel brake 4 of the motor vehicle.

A valve arrangement 5 is arranged in the brake line 3 between the braking pressure generation unit 2 and the wheel brake 4. The valve arrangement 5 consists of two solenoid valves 5a, 5b, each of which is driven by an electronic control unit ECU, in order to modulate the pressure in the wheel brake 4. For this purpose, the electronic control unit ECU determines the rotational behaviour of the vehicle wheel associated with the wheel brake 4, in order to set pressure increasing, pressure decreasing and pressure holding phases by controlling the solenoid valves 5a, 5b.

In the electrically non-activated condition, the first solenoid valve 5a assumes its opened position and the second solenoid valves 5b assumes its closed position, in order to be able to build up pressure in the wheel brake 4. With only the first solenoid valve 5a being activated, the first solenoid valve 5a will assume its closed position, and the second solenoid valve 5a will remain in its closed position so that the pressure in the wheel brake 4 is maintained constant. If both the first and the second solenoid valves 5a, 5b are activated, the first solenoid valve 5a will assume its closed position and the second solenoid valve will assume its opened position. In this case, brake fluid can flow from the wheel brake 4 via the second solenoid valve 5b into an intermediate reservoir 6. The brake fluid in the intermediate reservoir 6 is returned into the brake line 3 by means of a hydraulic pump 7. The hydraulic pump 7 is driven by an electric motor 8 which is also controlled by the electronic control unit ECU. The valve arrangement 5 can also be formed by a mechanical mass flow control valve instead of the first solenoid valve 5a or by an electromagnetically activated 3⁄2-way valve instead of the two solenoid valves 5a, 5b.

The braking pressure generation unit 2 comprises a pneumatic brake booster 21 for the amplification of the actuation force introduced via the brake pedal 1. A movable wall 22 divides the shell of the pneumatic brake booster 21 into a vacuum chamber 23 and a servo chamber 24. For the generation of the vacuum, the vacuum chamber 23 is connected to a vacuum source Vac (not shown).

In a motor vehicle equipped with an Otto engine, the vacuum which is inherently produced in the intake pipe is available as the vacuum source Vac. For a motor vehicle which is driven by a Diesel engine or an electric motor, however, an additional vacuum pump is required as the vacuum source Vac. Upon actuation of the brake pedal 1 the brake booster 21 is operated in a known manner such that the servo chamber 24 is subjected to atmospheric pressure so that a pressure difference acts upon the movable wall 22, which assists the actuation force introduced via the brake pedal 1. In the non-actuated condition, the vacuum chamber 23 and the servo chamber 24 are interconnected and thus pressure-compensated, so that no pressure difference is acting on the movable wall 22.

The brake booster 21 can also be electrically controlled via an electromagnet arrangement 26. The electromagnet arrangement 26 activates a control valve (not shown) in order to move the brake booster 21 into three different control positions (I, II, III):

a first so-called "build-up position" (I) in which the connection between the vacuum chamber 23 and the servo chamber 24 is closed and the connection between the servo chamber 24 and atmosphere is opened so that a pressure difference is built up or increased, respectively, at the movable wall 22; or a second so-called "holding position" (II) in which the connection between the vacuum chamber 23 and the servo chamber 24 as well as the connection between the servo chamber and atmosphere are closed so that a pressure difference acting on the movable wall 22 is maintained; or a third so-called "relieve position" (III) in which the connection between the vacuum chamber and the servo chamber 24 is opened and the connection between the servo chamber 24 and atmosphere is closed so that a pressure difference acting on the movable wall 22 is relieved by means of a pressure compensating operation.

In order to move the control valve into the different control positions (I, II, III), the electronic control unit ECU supplies the electromagnet arrangement 26 with a drive signal current $I_{26}$, with the setting of the above mentioned control positions being made by varying the drive current $I_{26}$, e.g. by means of pulse width modulation.

The braking pressure $p_{29}$ which is generated in the servo chamber 29 and fed into the brake line 3 is sensed by means of a sensor 31 and transmitted to the electronic control unit ECU in order to adjust the braking pressure $p_{29}$ as a function of a desired pressure value and/or pressure characteristic $p_{nominal}$ by varying the solenoid current $I_{26}$ which drives the electromagnet arrangement 26.

The electronic controllability of the brake booster 21 allows for carry out braking operations also automatically, i.e. independently of the actuation of the brake pedal 1. This is used for example to perform an anti-slip control or a driving dynamics control or a distance control action. A sensor means 11 is provided in order to determine the parameters (pedal travel, pedal force, pedal actuation speed) relating to the actuation of the brake pedal 1 for an evaluation in the electronic control unit ECU so that braking operations can be carried out also under emergency conditions, e.g. with the exceeding of a certain pedal actuation speed as criterion.

In the electronically controllable braking system shown in FIG. 1 a switching valve 51 is arranged in the brake line 3, which is driven by the electronic control unit ECU. The switching valve 51 serves to connect the braking pressure generation unit 2 either with the wheel brake 4 or the suction side 7e of the pump 7. For this purpose, the switching valve 51 is so designed, that in the electrically non-activated condition of the valve 51 the braking pressure generation 2 is connected with the wheel brake 4 while the connection with the suction side 7e of the pump 7 is closed. Upon the electric activation of the switching valve 51, the braking pressure generation unit 2 is connected with the suction side 7e of the pump 7 while the connection to the wheel brake 4 is closed. The embodiment of the switching valve 51 as a ⅔-way valve, as shown in FIG. 1, can be replaced in a known manner by two ½-way valves.

A pressure limiting valve 52 is connected in parallel with the switching valve 51, which upon exceeding a predetermined pressure value in the wheel brake 4 or at the output side 7a of the pump 7, respectively, makes a connection between the wheel brake 4 or the output side 7a of the pump 7, respectively, and the braking pressure unit 2.

A non-return valve 53 is arranged between the intermediate reservoir 6 and the suction side 7e of the pump 7, so that a flow connection is only possible in the direction from the intermediate reservoir 6 to the suction side 7e of the pump 7.

A driving dynamics control which improves the motor vehicle stability particularly during cornering through automatic braking or also an anti-slip control require a very rapid pressure buildup in the wheel brake 4. For this purpose, upon the initiation of a regulation process the pump 7 is started by activating the electric motor 8;

the switching valve 51 is activated in order to connect the braking pressure generation unit 2 with the suction side 7e of the pump 7, whereby the connection between the braking pressure generation unit 2 and the wheel brake 4 is closed; and the brake booster 21 is controlled independently of an actuation of the brake pedal 1.

This results in the quickfill of the pump 7 via its suction side 7e so that already during the starting phase an adequate pressure level is available at the output side 7a of the pump 7. The pressure $p_{29}$ to be adjusted in the servo chamber 29 of the braking pressure unit 2 by controlling the brake booster 21 amounts to approx. 5 to 30 bar, which is dependent i.a. on the surface conditions of the road. After the starting phase of the pump 7, the control of the brake booster 21 is completely or partially cancelled, and the pressure modulation in the wheel brake 4 is effected by controlling the valve arrangement 5. The activation of the switching valve 51 is cancelled only after the completion of the regulation process.

Figure 2:
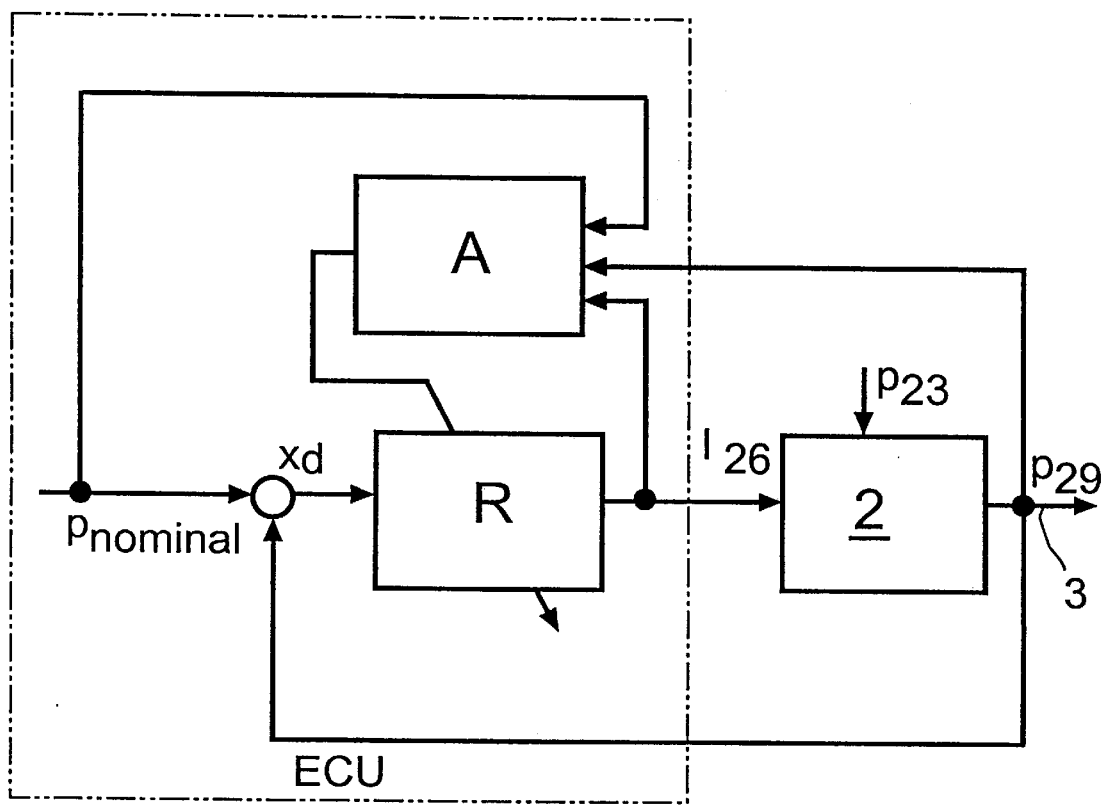
FIG. 2 shows a closed control loop for operating an electronically controllable braking system for motor vehicles.

FIG. 2 shows a closed control loop where the braking pressure generation unit 2 forms the controlled member. The output quantity and thus the controlled quantity is the braking pressure $p_{29}$ which is generated in the servo chamber 29. Input quantities to the controller member are the solenoid current $I_{26}$ for driving the electromagnet arrangement 26 as the manipulated variable and the vacuum $p_{23}$ prevailing in the vacuum chamber 23 as the disturbance variable. The controller means is preferably combined with the electronic control unit ECU and comprises a comparator which by subtracting the controlled quantity $p_{29}$ from the reference variable $p_{nominal}$ forms the controlled difference $x_d$ which is the input quantity of a controller R. The output quantity of the controller R is the manipulated variable $I_{26}$.

The controller R can be designed to be parameter optimal as well as structure optimal. As parameter optimal controllers primarily conventional controllers with proportional and/or integral and/or differential behaviour are employed which are either implemented in the form of an electronic circuit or by programming a process computer. As structure optimum controllers which are primarily programmed in a process computer, e.g. deadbeat controllers can be employed which are particularly suited for an adaptive regulation.

It is particularly advantageous to implement the controller means in the process computer of the electronic control unit ECU. If the controller R is designed as a PID controller it is programmable as a recursive algorithm with relatively low effort. On the basis of an idealized equation of an analog PID controller, with the amplification factor K, the integration time constant $T_I$ and the differentiation time constant $T_D$ which, as is known, is expressed as $$I_{26}(t) = K^* \left[ x_d(t) + 1/T_I^* \int_0^t x_d(t)dt + T_D^* dx_d(t)/dt \right];$$

the recursive regulation algorithm R can be obtained through discretisation as:

$$I_{26}(k) = p_1^* I_{26}(k-1) + q_0^* d(k) + q_1^* x_d(k-1) + q_2^* x_d(k-2);$$

where $I_{26}(t)$ is the solenoid current $I_{26}$ as a function of time (t), and $I_{26}(k)$ is the solenoid current for the present recursive iteration, (k−1) represents the previous recursive iteration, and (k−2) represents the recursive iteration preceding (k−1).

Assuming the dead time to be $T_0$, the following relations exist between the parameters of the analog PID controller and those of the recursive regulation algorithm R:

$p_1 := 1$
$q_0 := K^*(1 + T_D/T_0)$
$q_1 := -K^*(1 + 2T_D/T_0 - T_0/T_I)$
$q_2 := K^* T_D/T_0$

Based on these relations, the known adjustment rules of analog controllers for the parameters K, $T_I$, $T_D$ can be used in principle for adjusting the parameters $p_1$, $q_0$, $q_1$, $q_2$.

In addition, the controller R is superimposed by an adaptation algorithm A which by variation of the parameters $p_1$, $q_0$, $q_1$, $q_2$ adapts the behaviour of the recursive regulation algorithm R to varying properties of the braking pressure generation unit 2 to be controlled (controlled member) in order to improve the regulation quality and hence to contribute to the capacity of the system. Changes in the properties of the braking pressure generation unit 2 to be controlled (controlled member) are primarily caused by fluctuations of the vacuum $p_{23}$ (disturbance variable) which cannot be determined in advance and which primarily occur in motor vehicles with Otto engines.

As the adaptation algorithm A to be employed an algorithm "with feedback" (closed loop adaptation) is used which senses the varying properties of the braking pressure generation unit 2 (controlled member) indirectly, e.g. by a process identification or a continuous determination of the regulation quality. For this purpose, the adaptation algorithm A is supplied with the reference variable $p_{nominal}$, the controlled quantity $p_{29}$ and the manipulated variable $I_{26}$ as input quantities.

Alternatively, a "controlled" adaptation algorithm A (open loop adaptation) can be used. This, however, necessitates the measurement of the disturbance variable $p_{23}$, which would require an additional pressure sensor for sensing the vacuum $p_{23}$ prevailing in the vacuum chamber 23 as well as corresponding evaluation means which again would result in more complex system requirements and higher costs.

Figure 3A:
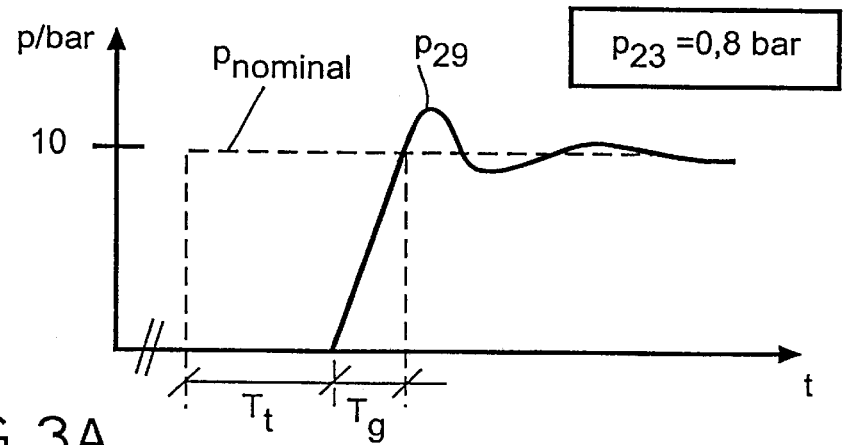
FIGS. 3a, 3b and 3c show three different control characteristics of a closed control loop for operating an electronically controllable braking system for motor vehicles.
Figure 3B:
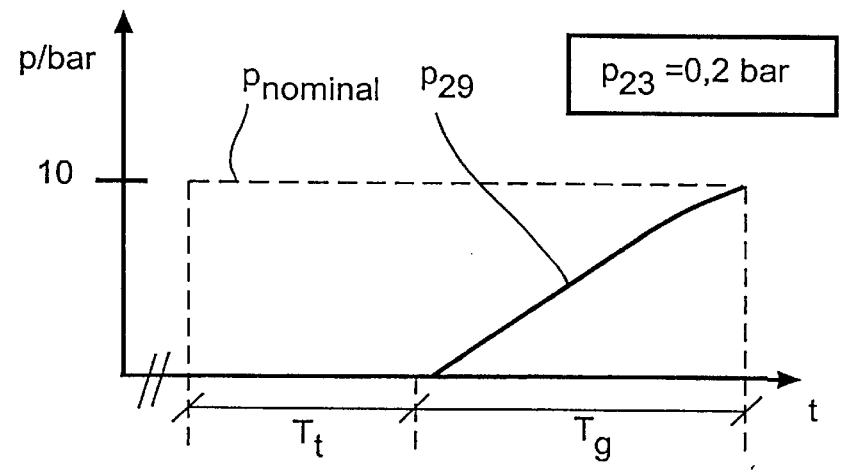

Changes of the properties of the braking pressure generation unit 2 to be controlled (controlled member) which result from various vacuum values $p_{23}$ (disturbance variable) will be described in the following with reference to the characteristic of the closed loop control, as it is shown in FIGS. 3a and 3b. FIGS. 3a and 3b show the braking pressure $p_{29}$ (controlled quantity) as a function of time, which according to FIG. 3a is obtained at an ideal vacuum $p_{23}$ in the order of 0.8 bar and according the FIG. 3b at a vacuum $p_{23}$ in the order of 0.2 bar, if the reference variable $p_{nominal}$ is increased in one step from 0 bar to a value in the order of 10 bar, and a controller R is employed which operates in accordance with a PID algorithm without the superimposed adaptation algorithm A, with the parameters $p_1$, $q_0$, $q_1$, $q_2$ being determined in an optimum manner for an ideal vacuum $p_{23}$ in the order of 0.8 bar.

Since the parameters $p_1$, $q_0$, $q_1$, $q_2$ are determined in an optimum manner for an ideal vacuum $p_{23}$ in the order of 0.8 bar, a very rapid adjustment behaviour is obtained for the braking pressure $p_{29}$ as a function of time shown in FIG. 3a, which is primarily characterized by a small time constant $T_g$ in the order of 20 ms. A vacuum $p_{23}$ in the order of 0,2 bar, however, results in a noticeable deterioriation of the adjustment behaviour, as can be seen from the braking pressure $p_{29}$ shown in FIG. 3b as a function of time. The time constant $T_g$ which characterizes the adjustment behaviour increases to a value in the order of 500 ms. An adjustment behaviour of such sluggishness reduces the system performance, which is particularly disadvantageous for a driving dynamics control where it is required that the braking pressure $p_{29}$ is built up in a time period as short as possible.

As a countermeasure, the controller R is superimposed by an adaptation algorithm A. With a vacuum $p_{23}$ in the order of 0.2 bar, this results in the braking pressure $p_{29}$ as a function of time shown in FIG. 3c, if the reference variable $p_{nominal}$ is increased in one step from 0 bar to the order of 10 bar. The use of the adaptation algorithm A enhances the adjustment behaviour considerably as compared to FIG. 3b so that a value of the time constant $T_g$ in the order of 30 ms is achieved. This enhancement is primarily due to the fact that the adaptation algorithm A primarily increases the controller amplification K by changing the parameters $p_1$, $q_0$, $q_1$, $q_2$ of the regulation algorithm R.

Figure 3C:
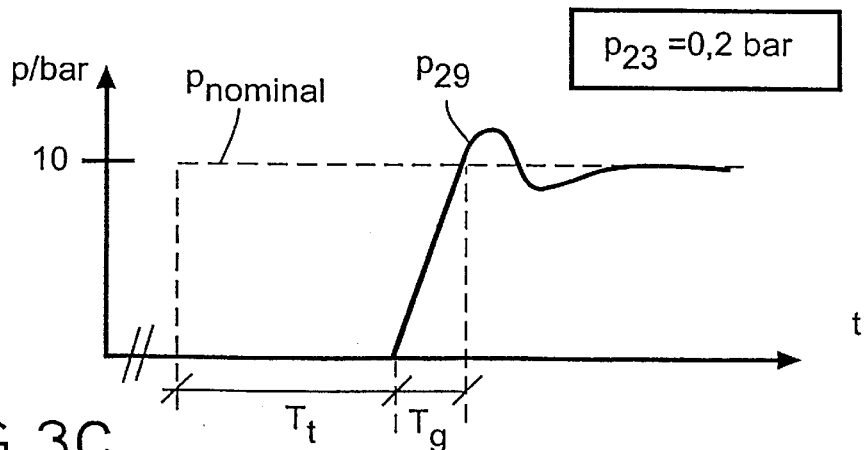

As can also be seen from FIGS. 3a to 3c, each of the curves of the braking pressure $p_{29}$ as a function of time includes a dead time $T_t$ which causes a delayed buildup of the braking pressure $p_{29}$. For a vacuum $p_{23}$ in the order of 0.8 bar (FIG. 3a) the dead time $T_t$ is approx. 40 ms while for a vacuum $p_{23}$ in the order of 0.2 bar (FIGS. 3b and 3c) the dead time $T_t$ is approx. 100 ms.

With a known dead time $T_t$ it is possible to draw conclusions as to the value of the pressure $p_{23}$ prevailing in the vacuum chamber 23. This relation can be utilized in an advantageous manner for the definition of an adaptation algorithm A which is shown in the form of a flow diagram in FIG. 4. Thereby:

in a first step 110 the commencement of a control operation is waited for, which, for example, can be seen from a change of the reference variable $p_{nominal}$;

in a second step 120, after having determined the commencement of a control operation, the controlled quantity $p_{29}$ is observed in order to continuously determine the dead time $T_t$ in a program step 121;

set the parameters $p_1$, $q_0$, $q_1$, $q_2$ as a function of the dead time $T_t$ in accordance with a predetermined relation; and in a program step 123 wait for the commencement of the change of the controlled quantity $p_{29}$;

in a third step 130, after having determined the commencement of the change of the controlled quantity $p_{29}$, the parameter setting for $p_1$, $q_0$, $q_1$, $q_2$ of the regulation algorithm R as previously determined in program step 122 is maintained;

in a fourth step 140 the termination of the control operation is waited for, as can be seen, for example, from a reset of the reference variable $p_{nominal}$;

in a fifth step 150, after termination of the control operation, the initialisation of the parameters $p_1$, $q_0$, $q_1$, $q_2$ is performed and the program continues with step 110.

Such an adaptation algorithm A can be programmed with little effort in the process computer of the electronic control unit ECU without requiring an increase of the process computer capacity so that no additional costs occur. Compared to this, an adaptation algorithm which identifies the controlled member on the basis of the manipulated variable $I_{26}$ and the controlled quantity $p_{29}$ through the estimation of parameters by means of a mathematic model in order to vary the controller parameters as a function of the estimated element parameters requires significantly higher programming efforts as well as an increase in computer capacity.

The determination of the dead time $T_t$ in program step 121 can be done by means of timer functions available in the process computer. It is therefore possible, for example, after the commencement of a control operation has been determined in the first step 110, to reset and restart a watchdog timer or a freerunning timer so that the current timer value can then be continuously read in program step 121 for the determination of the dead time $T_t$.

In program step 122 of the adaptation algorithm A the parameters $p_1$, $q_0$, $q_1$, $q_2$ are set as a function of the dead time $T_t$. If there is a linear relation between the parameters $p_1$, $q_0$, $q_1$, $q_2$ and the dead time $T_t$, the setting can be made by solving a simple mathematic equation. There is also the possibility to store a characteristics array table in the memory of the process computer, which contains predetermined relations between the parameters $p_1$, $q_0$, $q_1$, $q_2$ and the dead time $T_t$. In a further dimension of such a characteristics array the behaviour of the reference variable $p_{nominal}$ can be included in a simple manner. The value of a step change of the reference variable $p_{nominal}$, for example, represents a measure for the dynamics to be expected during the control operation so that noticeable overshooting which result in a deterioration of the regulation quality can be avoided by adjusting the parameters $p_1$, $q_0$, $q_1$, $q_2$ in order to achieve a higher damping effect.

The discrete adjustment of the parameters $p_1$, $q_0$, $q_1$, $q_2$ in order to achieve a change in the amplification factor K is very simple. In program step 122 the dead time $T_t$ determined in program step 121 is allocated a certain range of values, with a certain amplification factor K assigned to that range of values. If, for example, three discrete ranges of values are determined for the dead time $T_t$, then the following allocation table is obtained:

| Dead time: | Amplification factor: |
| --- | --- |
| $0 \leq T_t < 40$ ms | $K = K_1$ |
| $40$ ms $\leq T_t < 70$ ms | $K = K_2$ |
| $70$ ms $\leq T_t$ | $K = K_3$ |
| with $K_1 < K_2 < K_3$ | | so that with a short dead time $T_t$ which is a measure for a high vacuum pressure $p_{23}$ a smaller amplification factor is set than in the case of a long dead time $T_t$ which is a measure for a low vacuum pressure $p_{23}$.

With the initialisation in program step 150, the parameters $p_1$, $q_0$, $q_1$, $q_2$ for an ideal vacuum $p_{23}$ in the order of 0.8 bar are set in an optimum manner. For setting the parameters $p_1$, $q_0$, $q_1$, $q_2$ so as to change the amplification factor K as explained above, this means that the initialisation is to the smallest amplification factor $K_1$ which results in a short dead time $T_t$ which is a measure for a high (ideal) vacuum $p_{23}$.

Figure 4:
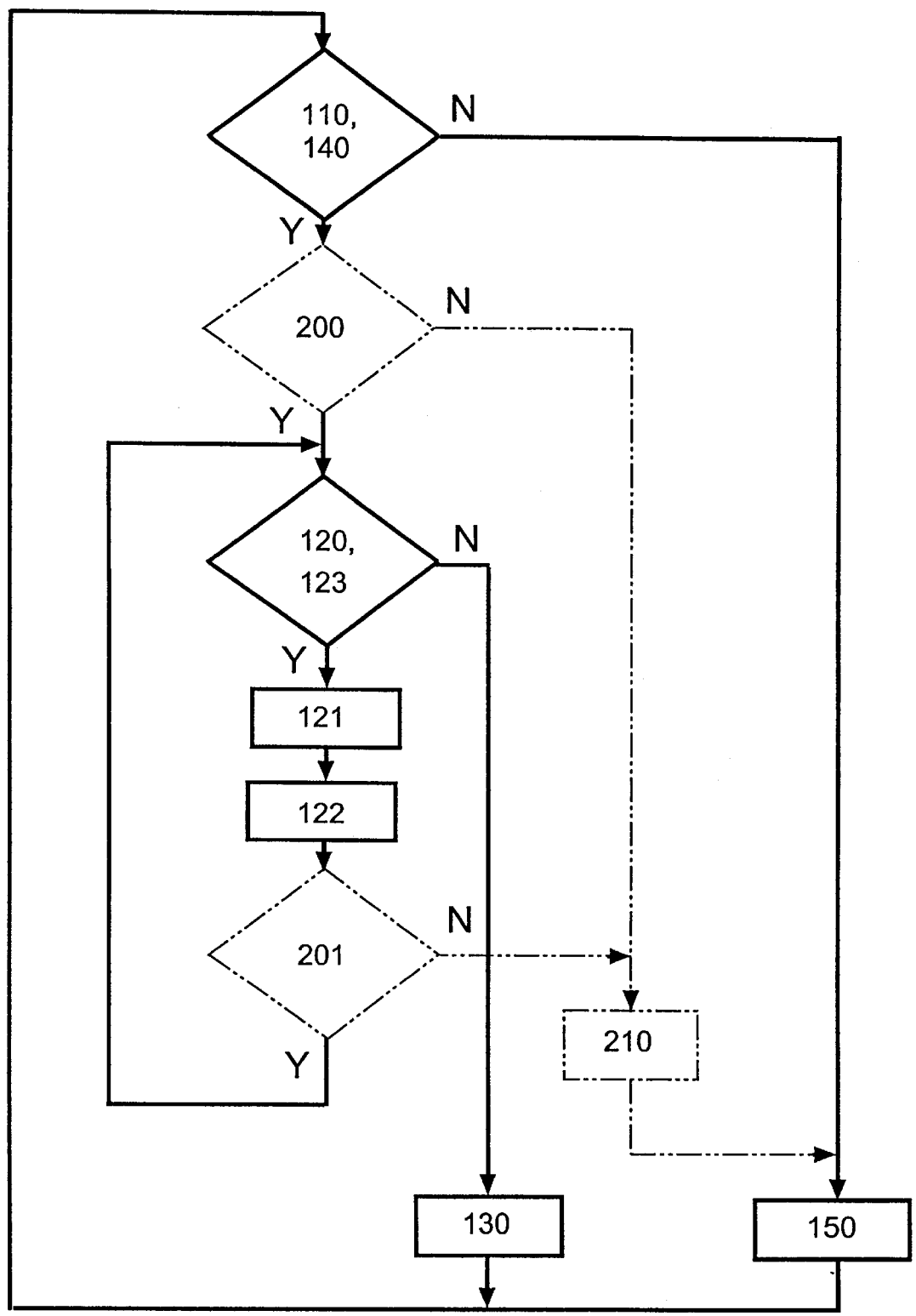
FIG. 4 shows a flow diagram of an adaptation algorithm for optimizing the control behaviour of an electronically controllable braking system for motor vehicles.

As can be seen in the flow diagram of FIG. 4, there is provided another optional program step 210 between the first and fourth step 110 and 140, respectively, and the second step 120 or the program step 123, respectively. The program step 210 serves to determine the time of a control operation, in order to abort said control operation if a given time limit is exceeded. This is done, for example, in a program step 220 by requesting a reset of the reference variable $p_{nominal}$ from the higher-order system or by effecting said reset directly and by continuing with the firth step 150 in order to initialize the parameters $p_1$, $q_0$, $q_1$, $q_2$ and to wait for the commencement of a new control operation. The determination of the time duration of the control operation can be performed in the same way as the determination of the dead time $T_t$ in program step 121 by utilizing the timer functions which are available in the process computer. A further optional program step 211 is provided between the program steps 122 and 123 which also monitors the determination of the dead time Tt and, in the case of exceeding a certain time limit, continues with program step 220 in order to abort the control operation.

The monitoring of the program steps 210 and 211 with respect to time contributes to a higher system safety. One the one hand, because a control operation is permitted for a certain period of time only so that a critical increase of the braking pressure $p_{29}$ is avoided. On the other hand, the system specific dead time $T_t$ is monitored so that upon exceeding or falling below pregiven limits, a conclusion as to system errors can be made and a corresponding corrective program can be executed.

I claim:

1. Electronically controlled brake booster for a motor vehicle brake system, comprising a housing having a vacuum chamber and a servo chamber separated from said vacuum chamber by a movable wall, a control valve unit operable by an electromagnet arrangement, said control valve unit being coupled to said movable wall for common relative movement with respect to said housing of said brake booster, said electromagnet arrangement being connectable to an electronic control unit (ECU) generating a drive signal ($I_{26}$) to operate said electromagnet arrangement, a braking pressure generation unit being operatively connected to said movable wall for generating a braking pressure for at least one brake of said motor vehicle in dependence from the position of said movable wall, characterized in that said drive signal ($I_{26}$) is generated in said electronic control unit (ECU) in dependence from at least one control parameter (K, $T_I$, $T_D$; $p_1$, $q_0$, $q_1$, $q_2$), and said at least one control parameter (K, $T_I$, $T_D$; $p_1$, $q_0$, $q_1$, $q_2$) being adjusted in dependence from a dead time ($T_t$) of said braking pressure between supplying said electromagnet arrangement with said drive signal ($I_{26}$) and a rising of said braking pressure in response thereto.

2. Electronically controlled brake booster for a motor vehicle brake system according to claim 1, comprising a sensor sensing operating conditions of the motor vehicle brake system for said electronic control unit (ECU) and producing signals which are characteristics for said operating conditions, which signals are evaluated by said control unit (ECU) for producing said drive signal.

3. Electronically controlled brake booster for a motor vehicle brake system according to claim 2, characterized in that
said sensor is formed as a pressure sensor sensing at least said braking pressure ($p_{29}$).

4. Electronically controlled brake booster for a motor vehicle brake system according to claim 3, characterized in that
said electronic control unit is provided with a process computer (microprocessor), having an input port for a reference variable ($P_{nominal}$), an output port for said drive signal ($I_{26}$), and wherein said control parameters (p, $q_0$, $q_1$, $q_2$) are the characteristics of a recursive control algorithm executed in the process computer based on the following equation:

$$I_{26}(k)=p_1{}^*I_{26}(k-1)+q_0{}^*xd(k)+q_1{}^*x_d(k-1)+q_2{}^*x_d(k-2)$$

where the sampling time is $T_0$; $p_1=1$; $q_0=K(1+T_D/T_0)$, $q_1=-K(1+2\ T_D/T_0-T_0/T_1)$; and $q_2=K\ T_D/T_0$.

5. Electronically controlled brake booster for a motor vehicle brake system according to claim 2, characterized in that
said electronic control unit (ECU) is provided with a controller means (A, R) having an input port for a reference variable ($p_{nominal}$), an output port for said drive signal ($I_{26}$), and wherein said control parameters (K, $T_I$, $T_D$) are characteristics of the controller means (A, R) having PID action with the amplification factor K, the integration time constant $T_I$ and the differentiation time constant $T_D$, such that the drive signal ($I_{26}$) is expressed as $$I_{26}(t) = K^* \left[ x_d(t) + 1/T_I{}^* \int_0^t x_d(t)dt + T_D{}^*dx_d(t)/dt \right].$$

6. Electronically controlled brake booster for a motor vehicle brake system according to claim 5, characterized in that
said PID action of said controller means is superimposed by an adaptation means (A) adjusting said control parameters ($P_1$, $q_0$, $q_1$, $q_2$) in order to adapt the behavior of the PID action of the controller means to varying properties of the braking pressure generation unit.

7. Electronically controlled brake booster for a motor vehicle brake system according to claim 5, characterized in that said electronic control device is adapted to determine whether a maximum value of the dead time $T_t$ is exceeded by starting a watchdog timer upon the detecting of a change of the reference variable ($P_{nominal}$).

8. Electronically controlled brake booster for a motor vehicle brake system according to claim 5, characterized in that
said electronic control unit is provided with a process computer (microprocessor), having an input port for a reference variable ($P_{nominal}$), an output port for said drive signal ($I_{26}$), and wherein said control parameters (p, $q_0$, $q_1$, $q_2$) are the characteristics of a recursive control algorithm executed in the process computer based on the following equation:

$$I_{26}(k)=p_1{}^*I_{26}(k-1)+q_0{}^*xd(k)+q_1{}^*x_d(k-1)+q_2{}^*x_d(k-2)$$

where the sampling time is $T_0$; $p_1=1$; $q_0=K(1+T_D/T_0$, $q_1=-K(1+2\ T_D/T_0-T_0/T_1)$; and $q_2=K\ T_D/T_0$.

9. Electronically controlled brake booster for a motor vehicle brake system according to claim 8, characterized in that
said PID action of said controller means is superimposed by an adaptation means (A) adjusting said control parameters ($p_1$, $q_0$, $q_1$, $q_2$) in order to adapt the behavior of the PID action of the controller means to varying properties of the braking pressure generation unit.

10. Electronically controlled brake booster for a motor vehicle brake system according to claim 9, characterized in that said electronic control device is adapted to execute the following steps:
monitoring the reference variable ($p_{nominal}$) in order to detect a change thereof,
continuously
determining whether the dead time $T_t$ has ended,
setting the parameters $p_1$, $q_0$, $q_1$, $q_2$ as a function of the current value of the dead time $T_t$ in accordance with predetermined relations; and
determining whether the braking pressure ($p_{29}$;) has changed.

11. Electronically controlled brake booster for a motor vehicle brake system according to claim 8, characterized in that said electronic control device is adapted to determine whether a maximum value of the dead time $T_t$ is exceeded by starting a watchdog timer upon the detecting of a change of the reference variable ($P_{nominal}$).

12. Electronically controlled brake booster for a motor vehicle brake system according to claim 5, characterized in that
said control parameters ($p_1$, $q_0$, $q_1$, $q_2$) are being adjusted in dependence from the dead time ($T_t$) when the sensor means signals are rising of said braking pressure.

13. Electronically controlled brake booster for a motor vehicle brake system according to claim 12, characterized in that
said PID action of said controller means is superimposed by an adaptation means (A) adjusting said control parameters ($p_1$, $q_0$, $q_1$, $q_2$) in order to adapt the behavior of the PID action of the controller means to varying properties of the braking pressure generation unit.

14. Electronically controlled brake booster for a motor vehicle brake system according to claim 13, characterized in that said electronic control device is adapted to execute the following steps:
monitoring the reference variable ($P_{nominal}$) in order to detect a change thereof,
continuously
determining whether the dead time $T_t$ has ended,
setting the parameters $p_1$, $q_0$, $q_1$, $q_2$ as a function of the current value of the dead time $T_t$ in accordance with predetermined relations; and
determining whether the braking pressure ($p_{29}$;) has changed.

15. Electronically controlled brake booster for a motor vehicle brake system according to claim 2, characterized in that
said control parameters ($p_1$, $q_0$, $q_1$, $q_2$) are being adjusted in dependence from the dead time ($T_t$) when the sensor means signals are rising of said braking pressure.

16. Electronically controlled brake booster for a motor vehicle brake system according to claim 2, characterized in that
said electronic control unit is provided with a process computer (microprocessor), having an input port for a reference variable ($P_{nominal}$), an output port for said drive signal ($I_{26}$), and wherein said control parameters (p, $q_0$, $q_1$, $q_2$) are the characteristics of a recursive control algorithm executed in the process computer based on the following equation:

$$I_{26}(k)=p_1{}^*I_{26}(k-1)+q_0{}^*xd(k)+q_1{}^*x_d(k-1)+q_2{}^*x_d(k-2)$$

where the sampling time is $T_0$; $p_1=1$; $q_0=K(1+T_D/T_0)$, $q_1=-K(1+2\ T_D/T_0-T_0/T_1)$; and $q_2=K\ T_D/T_0$.

17. Electronically controlled brake booster for a motor vehicle brake system according to claim 1, characterized in that said electronic control unit is provided with a process computer (microprocessor), having an input port for a reference variable ($P_{nominal}$), an output port for said drive signal ($I_{26}$), and wherein said control parameters (p, $q_0$, $q_1$, $q_2$) are the characteristics of a recursive control algorithm executed in the process computer based on the following equation:

$$I_{26}(k)=p_1{}^*I_{26}(k-1)+q_0{}^*xd(k)+q_1{}^*x_d(k-1)+q_2{}^*x_d(k-2)$$

where the sampling time is $T_0$; $p_1=1$; $q_0=K(1+T_D/T_0)$, $q_1=-K(1+2\ T_D/T_0-T_0/T_1)$; and $q_2=K\ T_D/T_0$.

18. Electronically controlled brake booster for a motor vehicle brake system according to claim 1, characterized in that said control parameters ($p_1$, $q_0$, $q_1$, $q_2$) are being repeatedly adjusted during the lapse of the dead time in dependence from the current duration of the dead time ($T_t$).

19. Electronically controlled brake booster for a motor vehicle brake system according to claim 1, characterized in that said electronic control device is adapted to execute the following steps:

monitoring the reference variable ($P_{nominal}$) in order to detect a change thereof, continuously determining whether the dead time $T_t$ has ended, setting the parameters $p_1$, $q_0$, $q_1$, $q_2$ as a function of the current value of the dead time $T_t$ in accordance with predetermined relations; and determining whether the braking pressure ($p_{29}$;) has changed.

20. Electronically controlled brake booster for a motor vehicle brake system according to claim 1, characterized in that said electronic control device is adapted to set the control parameters K, $T_I$, $T_D$, $p_1$, $q_0$, $q_1$, $q_2$ as in accordance with predetermined time intervals of the dead time $T_t$.

* * * * *